United States Patent [19]

Botzenhardt et al.

[11] Patent Number: 5,111,460
[45] Date of Patent: May 5, 1992

[54] PROCESS FOR THE LOCALIZATION OF DEFECTIVE STATIONS IN LOCAL NETWORKS AND ASSOCIATED INTERFACE CONTROLLER

[75] Inventors: Wolfgang Botzenhardt, Göppingen; Siegfried Dais, Gerlingen; Uwe Kiencke, Regensburg; Martin Litschel, Vaihingen; Jan Unruh, Stuttgart, all of Fed. Rep. of Germany

[73] Assignee: Robert Bosch GmbH, Stuttgart, Fed. Rep. of Germany

[21] Appl. No.: 687,999

[22] Filed: Apr. 19, 1991

Related U.S. Application Data

[63] Continuation of Ser. No. 327,958, Feb. 10, 1989, abandoned.

Foreign Application Priority Data

[30]
Jun. 10, 1987 [DE] Fed. Rep. of Germany ....... 3719283

[51] Int. Cl.⁵ .............................................. G06F 11/00
[52] U.S. Cl. .................................. 371/29.1; 371/5.5; 371/11.2; 371/20.6; 370/13
[58] Field of Search ...................... 371/5.1, 5.5, 7, 8.2, 371/9.1, 11.1, 11.2, 11.3, 15.1, 16.1, 16.4, 16.5, 20.1, 20.6, 29.1; 364/186, 184, 200, 431.04; 370/13, 85.1, 85.5; 340/825.16, 825.06

[56] References Cited

U.S. PATENT DOCUMENTS

| | | | |
|---|---|---|---|
| 4,031,375 | 6/1977 | Jaskulke | 371/16.1 |
| 4,500,951 | 2/1985 | Sugimoto | 371/9.1 X |
| 4,872,165 | 10/1989 | Mori | 371/11.2 |
| 4,878,049 | 10/1989 | Ochiai | 371/5.5 |
| 4,914,657 | 4/1990 | Walter | 371/11.3 |

Primary Examiner—Robert W. Beausoliel
Attorney, Agent, or Firm—Michael J. Striker

[57] ABSTRACT

A process for the localization of defective stations in local networks which consist of several locally distributedly operating stations is proposed, particularly for use in automobiles. The process is characterized by station-internal, statistical evaluation of external and/or internal error signals. The redundancy necessary for a self-monitoring of the stations interconnected by a serial bus need not be available locally in the respective station, rather only the redundancy existing in any case in a network due to the presence of protocol-compatible stations is utilized.

8 Claims, 4 Drawing Sheets

5,111,460

PROCESS FOR THE LOCALIZATION OF DEFECTIVE STATIONS IN LOCAL NETWORKS AND ASSOCIATED INTERFACE CONTROLLER

CROSS-REFERENCE TO RELATED APPLICATION

This is a continuation of application Ser. No. 327,958 filed Feb. 10, 1989 now abandoned.

BACKGROUND OF THE INVENTION

This invention relates to a process for localisation of defective stations in a local network of stations each provided with error detection- and error reporting means which act in response to station-internal conditions.

Such a local network (FIG. 1) serves for the transmission of information between several stations, which are coupled to one another via a bus.

The communication takes place in the way that information is transmitted bit-serially from the sender stations in coded form and as messages. Depending on the bus concept, there may be one or else several receiver stations, which accept a message and decode the information.

The manner in which the receivers of a message are determined depends essentially on the bus concept (SAE paper 830536). In some systems, the station are provided with station addresses, the addresses of sender and receiver being contained in the messages as a constituent part. A station becomes the receiver of a message if it finds its station address in the message. This means, however, that the user has to know the station addresses of other stations in order to transmit a message.

If several stations are to receive a message, this message must be sent by the sender station several times an appropriate receiver station address in each case. Thus, in such systems, elements of the system configuration must be known and administered on the user level. Other systems do not have station addresses and the associated restricted system flexibility. In the case of these systems, each information item is uniquely marked by an identifier. Each station decides on the basis of the identifier whether it has to accept the message or not. In this case, a message can be received from several stations simultaneously. An example of such a local network is the Controller Area Network (CAN), conceived for use in automobiles (SAE paper 860391).

In order to ensure data integrity in local networks, receiver stations check the correctness of a received message by means of error security processes and report back to the sending station the correct or incorrect reception of the message. Such a check-back report may take place by acknowledgement of the reception in a special acknowledgement sector of the message (FIG. 2). Also, specific bit sequences may be provided as error message and used by each station in the event of an error to break off a transmission of a message in progress which has been detected as erroneous and to arrange that all other stations likewise do not accept the message (FIG. 3).

The capability of stations to break off incorrectly transmitted messages can lead to adverse effects going as far as blockage of the bus if, in an extreme case, all transmitted messages are wrongly declared erroneous by a defective station. In such a situation, due to the defect of one station, none of the other stations would be capable any longer of using the bus for communication purposes.

SUMMARY OF THE INVENTION

An object of the invention is a localization process for the detection and, if appropriate, disconnection of defective stations in local networks which guarantees that, even in worst cases, the communication between intact stations is maintained, at least restrictedly.

The system configuration, in particular of networks, in automobiles, may vary greatly according to the extent of the equipment of the vehicles. Therefore, an essential requirement for motor vehicle networks is the system flexibility which allows stations to be added or removed without necessitating modifications in the controlling of the transmission and the error handling. The object is to ensure in a local network an optimum monitoring capability compatible with the required system flexibility.

ADVANTAGES OF THE INVENTION

1) Each station of the network checks itself with regard to its operability. No station check another station with regard to its operability.
2) The process is independent of details or particular features of the system configuration, in the way that no administration and transmission of information about the system configuration is necessary for the detection of defects.
3) Sporadically occurring errors can be distinguished from permanent defects.
4) Stations detecting themselves as defective can be separated entirely or partially from the bus, so that the communication between the other stations on the bus is still possible, at least restrictedly.
5) The redundancy necessary for a self-monitoring of the stations in a local network need not be available in the respective station. Rather, only the redundancy existing in any case in the network due to the presence of protocol-compatible stations, is utilised.

BRIEF DESCRIPTION OF THE DRAWINGS

Exemplary embodiments of the invention (generally and in relation to the Controller Area Network conceived for use in automobiles) and of the prior art are represented in the drawing and will be described and explained in more detail below. In the drawing.

DESCRIPTION OF THE PREFERRED EMBODIMENTS

1. Statistical Station Monitoring

The aim is to distinguish between sporadically occurring errors and permanent defects in stations by continuously implemented self-monitoring in order that defective stations can be disconnected locally and separated form the network.

Due to the necessity that all stations present in a network must be protocol-compatible, there is inevitably redundancy at system level, irrespective of the structure of the individual stations.

This redundancy at system level is reflected in the bit stream detectable on the bus and arising from the interaction of all stations. This bit stream includes in particular information such as error messages and acknowledgements for erroneous and correct transmissions, respectively.

The fact that the internal states of each station are set in relation to the information obtained from the bit stream gives each station the possibility of detecting, classifying and weighting any malfunctioning of its own, without redundancy having to be implemented in the station.

Malfunctioning of a station may be due to sporadic errors or to permanent defects. In order to be able to distinguish between the two causes of error, statistics on the relative occurrence of weighted malfunctioning of the station are kept in each station, independently of all others.

Figure 1:
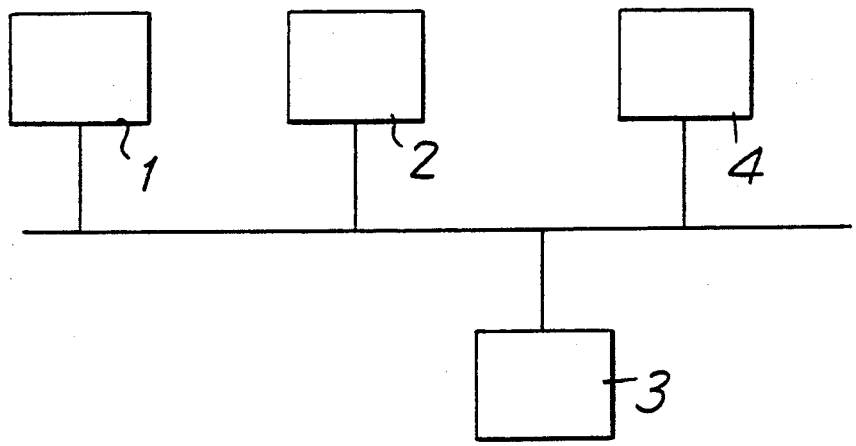
FIG. 1 shows an example of a local network of receiving and transmitting stations.
Figure 2:
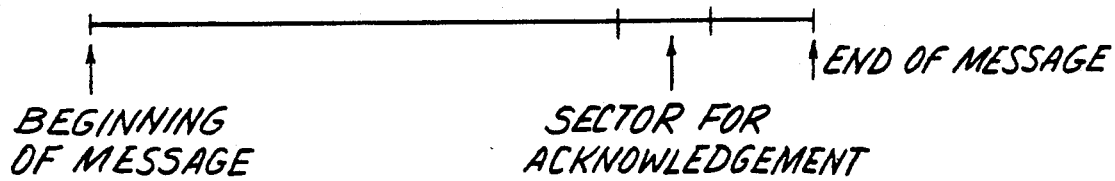
FIG. 2 shows an acknowledgement sector within a message.
Figure 3:
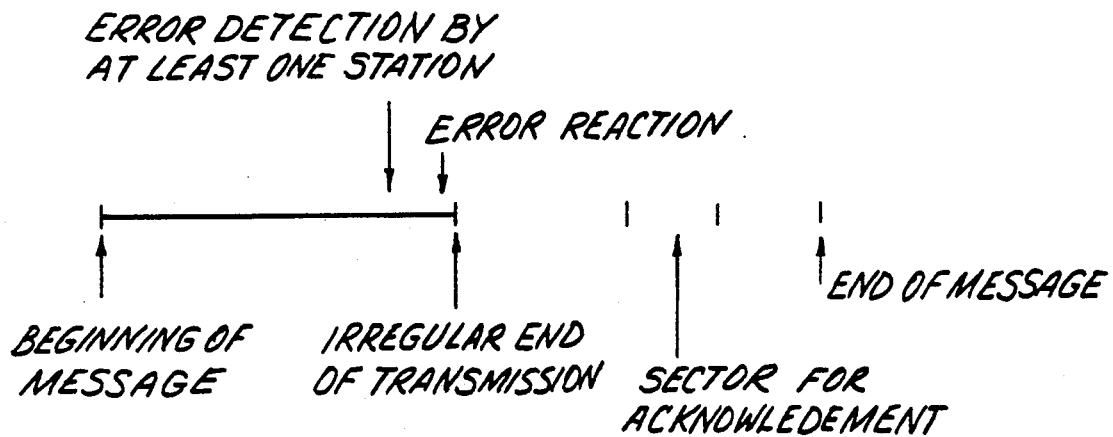
FIG. 3 shows an abnormal termination of a message.
Figure 4:
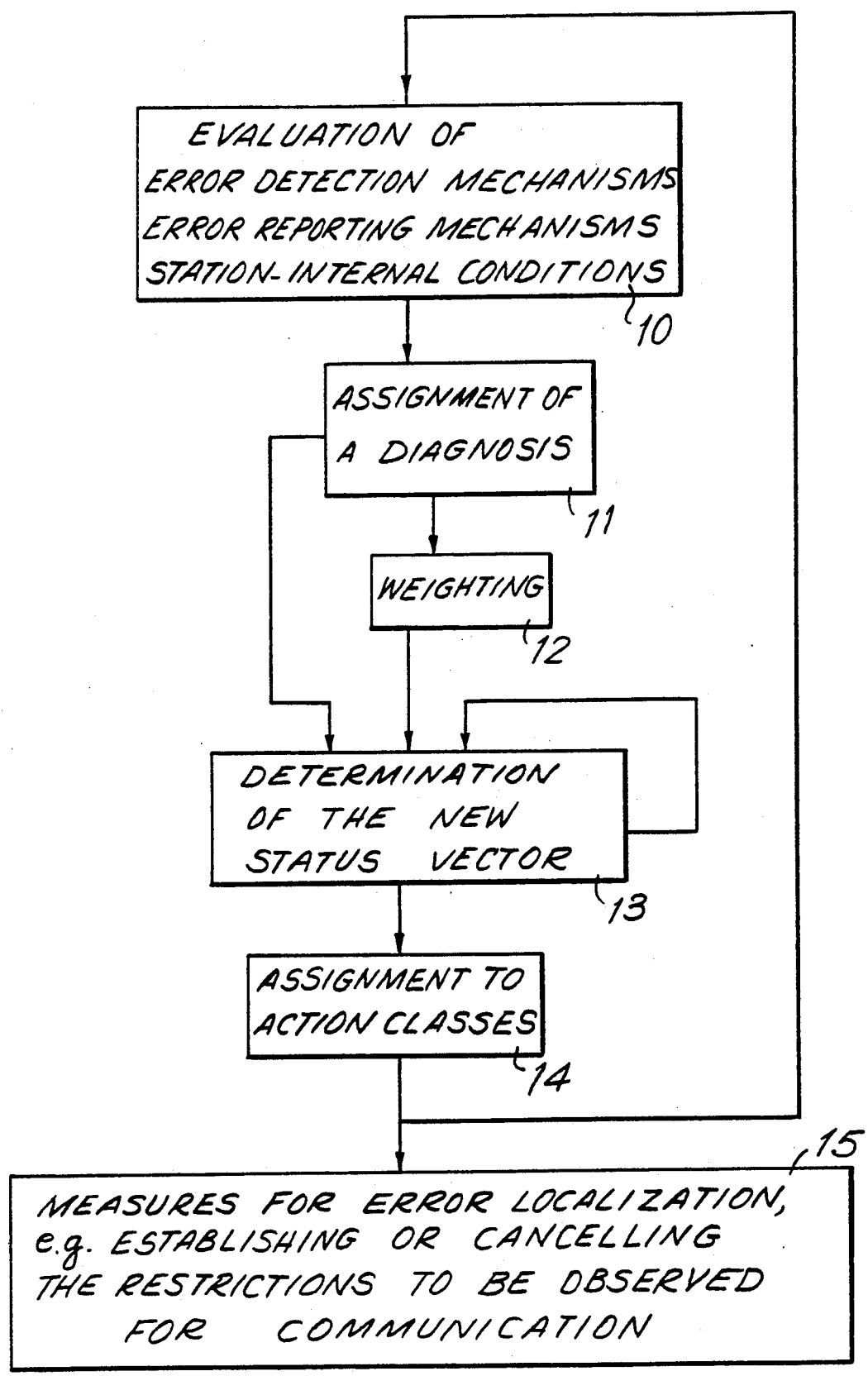
FIG. 4 shows a flow chart of a self-monitoring sequence.

FIG. 4 the functional sequence of the self-monitoring. All the information available in an error situation, which is made up of combinations of messages from error detection mechanisms, error reporting mechanisms and of station-internal conditions is collectively assigned a diagnosis. This diagnosis is an interim result of the monitoring process, it classifies the existing error, but is not yet directly assigned any action. In addition, there are a number of status words which describe the state of the station with respect to the malfunction, this state being determined by error frequency and types of error over lengthy periods. Each diagnosis provides a weighting with respect to each status word and the status words are modified with these weightings during the diagnosis. The actual measures for error localization are taken in dependence on the values of the status words, which are combined to form a status vector. If the status vector assumes certain (vectorial) values, actions corresponding to these values are initiated.

1.1. Error Detection Mechanisms, Error Reporting Mechanisms, Station-Internal Conditions (FIG. 4 block 10)

With each message sent or received, the individual station decides whether this message has been correctly or incorrectly transmitted from the viewpoint of the station. In order to decide whether a message has been transmitted correctly or incorrectly, there are various mechanisms in each station:

a) A plurality of error detection mechanisms or stages. Discovery of global errors, affecting all stations, as well as of local errors, affecting only some of the stations. Examples of error detection mechanisms are CRC checking, monitoring of bit-stuffing rules, format checking, self-monitoring, for example of the message sent.

The plurality of error detection mechanisms is assigned a variable FD with integer values, which specifies which error detection mechanism or which combination of these is present and at which time and in which constant the error is discovered.

For example:
FD=0: means no error

FD=1: means at least one of the detectors reports an error during the transmission of a message (combination of all error detection mechanisms)

b) A plurality of error reporting mechanisms or stages between the stations. Examples of error reporting mechanisms are error messages, positive acknowledgement, negative acknowledgement, distinction between error messages according to the gravity of the error (serious error, less serious error).

The plurality of error reporting mechanisms is assigning a variable FM with integer values, which specifies which error reporting mechanism or which combination of these is present.

For example:
FM=0: means positive acknowledgement
FM=1: means negative acknowledgement
FM=2: means no acknowledgement
FM=3: means error message
etc.

c) A plurality of station-internal conditions. These include message-related conditions, for example whether the station is sender or receiver of the message. There are station-related conditions, for example whether the self-monitoring of the station has already imposed restrictions for participation in communication or not.

The plurality of internal conditions is assigned a variable IB with integer values, which specifies which internal condition or which combination of these is present.

For example:
IB=0: means station is sender of the message
IB=1: means station is receiver of the message
etc.

1.2. Assignment of Diagnoses (FIG. 4, block 11)

The error checking state 10 assigns the triplets of variables (FD, FM, IB) to a diagnosis from the set D of diagnoses.

A diagnosis can determine:
Message correctly transmitted, message transmission with serious or less serious error, error during an error message etc.

The error checking stage thus defines a mapping (FD, FM, IB)→DU( )

(Map area: set of the diagnoses combined with an empty set).

A rule indicates that the triplet of variables (FD, FM, IB)
is relevant (namely is mapped onto a diagnosis from D)
is irrelevant (namely is mapped onto the empty set ( )).

To establish the set of rules, only the relevant rules are to be specified, the irrelevant ones are thereby implicitly codetermined.

1.3. Status Words, Weighting of the Diagnoses (FIG. 4, block 12)

In each station there are
n: status words $s_m 1 \leq m \leq n$ k: different diagnoses which occur as results of error checks (for example message correct, with serious/less serious error):

$D_i, 1 \leq i \leq k.$

The diagnoses can also be written as dimensional vectors:

$$D_i = (0 \ldots 0, 1, 0, \ldots 0) \; (1 \leq i \leq k)$$
$$\phantom{D_i = (0 \ldots 0, }\text{ith place}$$

For each status word $S_m$ and each diagnosis $D_i$ there is an integer number $$g_{i,m} \; (1 \leq i \leq k, 1 \leq m \leq n)$$

which specifies the weight of the corresponding diagnosis with which the corresponding status word takes the diagnosis into account. This system of weights can be written as $k \times n$ matrix:

$$G(D,S) = (g_{i,m}) \; 1 \leq i \leq k, 1 \leq m \leq n)$$

1.4. Implementation of Error Statistics, Status Vector

(FIG. 4, block 13)

The vector of the status words within a station is modified according to each event, to which a diagnosis $D_i$ is assigned:

$$(S_{old}, D_i, G(D,S)) \rightarrow S_{new}$$

The map can, for example, be defined as follows:

$$(S_1, \ldots, S_n) := (S_1, \ldots, S_n) + D_i \cdot G(D,S)$$

1.5. Assignment of the Status Vector to Action Classes, Measures for Error Localization

(FIG. 4, blocks 14, 15)

The status vectors are used by the station monitoring to initiate actions, such as for example establishing or cancelling of restriction for bus access.

For this purpose, action classes are defined: an action class is a subset of the set of all status vectors.

If S is the status vector before an event modifying the status vector and S' is the status vector modified by this event, and if A is an action class, the action belonging to A (for example establishment of restrictions for bus access) is initiated when the following holds:

not $S \in A$; $S' \in A$.

In the example mentioned, the rules for bus access are restricted as soon as the status vector is in A.

In station monitoring, apart from an action, the associated reverse action can also be realized. With respect to the above example, the reverse action would be cancellation of the restrictions for bus access.

The action classes for action and associated reverse action should be disjoint, in order that actions and reverse actions cannot be initiated simultaneously by any modification of the status vector.

If the action classes for action and reverse action cover the entire set of all status vectors, then the following holds:

If A is the action class for the action, the action is initiated as soon as the following holds for the status vector S:

$S \in A.$

The associated reverse action is initiated as soon as the following holds for the status vector S:

not $S \in A.$

It is, however, not necessary that the action classes for action and reverse action cover the set of all status vectors. If coverage is not the case, to be precise in such a way that, by corresponding modifications, the status vector can drop out of an action class without at the same time coming into the reverse action class, in this way a hysteresis for the initiation of action and reverse action is defined. This is so since, by definition, actions are initiated by the current status vector on entering into an action class but not on exiting from an action class.

EXAMPLES

The following 4 examples show possibilities for the definition of action classes.

The action classes and reverse action classes are formed in each case in these examples according to the following pattern: Let x be an integer number and let s (m, x) and S* (m, x) for $1 < m < n$ be the sets of those status vectors for which the following holds:

$S \in S(m, x) \; \langle - - \rangle$
$\quad S = (x_1, \ldots, x_n)$
$\quad$ with $x_i \; 1 \leq i \leq n$ integer numbers
$\quad$ and $x_m \geq x;$ $S \in S^*(m, x) \; \langle - - \rangle$
$\quad S = x_1, \ldots, x_n)$
$\quad$ with $x_i \; 1 \leq i \leq n$ integer numbers
$\quad$ and $x_m \leq x.$ Definition of action classes:

The action class A(x) for a given integer number x is defined by:

$A(x): = \bigcup_{1 \leq m \leq n} S(m, x)$ (set union).

Then, A(x) is the set of the status vectors for which at least one status word is greater than x.

Definition of reverse action classes:

The reverse action class A*(x) for a given integer number x is defined by:

$A^*(x): = \bigcap_{1 \leq m \leq n} S^*(m, x)$ (Intersection set).

Then, A*(x) is the set of the status vectors for which all status words are less than x.

a) The action class "notification of the user level due to frequent bus errors" may be formed, for example, as follows:

Take an integer number x1 and form the action class A(x1).

A notification takes place if the following applies for the status vector S before a current error and for the status vector S' after this error:

$S' \in A(x1)$; not $S \in A(x1).$

The reverse action, "notification of the user level due the reduced error frequency of the bus" may be similarly formed:

Take an integer number x2 and form the reverse action class $A^*(x2)$.

A notification takes place if the following holds for the status vector S before a current error and for the status vector S' after this error:

$$S' \in A^*(x2), \text{ not } S \in A^*(x2).$$

If $x1 \geq x2+1$ is chosen, a hysteresis is obtained with respect to the initiation of notifications.

b) The action class "changing the rules for bus access" may, for example, be formed as follows:

Taken an integer number x3 and form the action class $A(x3)$

The rules for bus access are changed (for example, with a multi-master bus system, it may be required that the station is only permitted to send twice in succession if it leaves a pause between these two transmissions; in this way, it is achieved that other stations wishing to send have priority over the 2nd message to be transmitted, irrespective of the message priorities in sending), as soon as the following holds for the current status vector S:

$$S \in A(x3).$$

The reverse action, "restoring the normal rules for bus access" may be similarly formed:

Take an integer number x4 and form the reverse action class $A^*(x4)$.

The original rules for bus access are restored as soon as the following holds for the current status vector S $$S \in A^*(x4).$$

If $x3 \geq x4+1$ is chosen, a hysteresis is obtained with respect to the changes in the rules for bus access.

c) The action class "suspension of authorisation of error messages" may, for example, be formed as follows:

Take an integer number x5 and form the action class $A(x5)$.

Error messages maya no longer be issued (in the event of an error) as soon as the following holds for the current status vector S:

$$S \in A(x5).$$

In this way, it can be achieved for example that messages are not mistakenly invalidated due to a defect.

The reverse action, "re-authorisation of the issuing of error messages" may be similarly formed:

Taken an integer number x6 and form the reverse action class $A^*(x6)$.

Error messages may be issued again (in the event of an error) as soon as the following holds for the current status vector S $$S \in A^*(x6).$$

If $x5 > x6+1$ is chosen, a hysteresis is obtained with respect to the suspension and re-authorisation of the issuing of error messages.

d) The action class "implementation of self-disconnection" may, for example, be formed as follows: Take an integer number x7 and form the action class $A(x7)$.

The station is uncoupled from the bus with respect to the sending and/or with respect to the receiving of messages as soon as the following holds for the current status vector S:

$$S \in A(x7).$$

In this way, it can be achieved, for example that defective stations can no longer disturb bus operation.

The reconnection of a station uncoupled from bus operation can take place in various ways. For instance, a regeneration may take place via the user level, or there may be a self-monitored period of time, after the expiry of which a reconnection takes place automatically. Similarly, a given number of correctly received messages may be awaited (only in sending disconnection), etc.

1.6. Linking of Station Monitoring into the Communication Sequence

Figure 5:
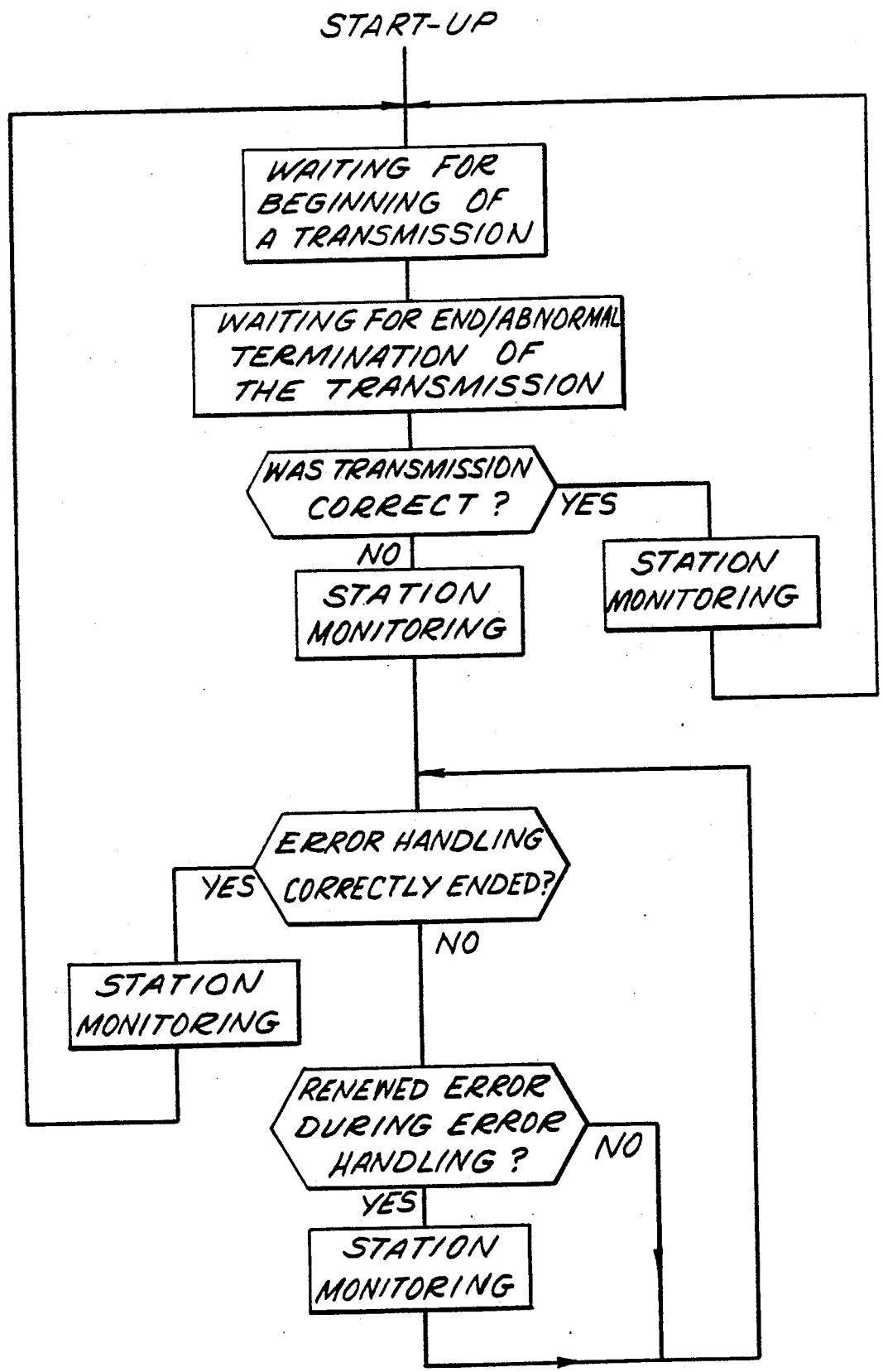
FIG. 5 shows a linking of the station monitoring.
Figure 6:
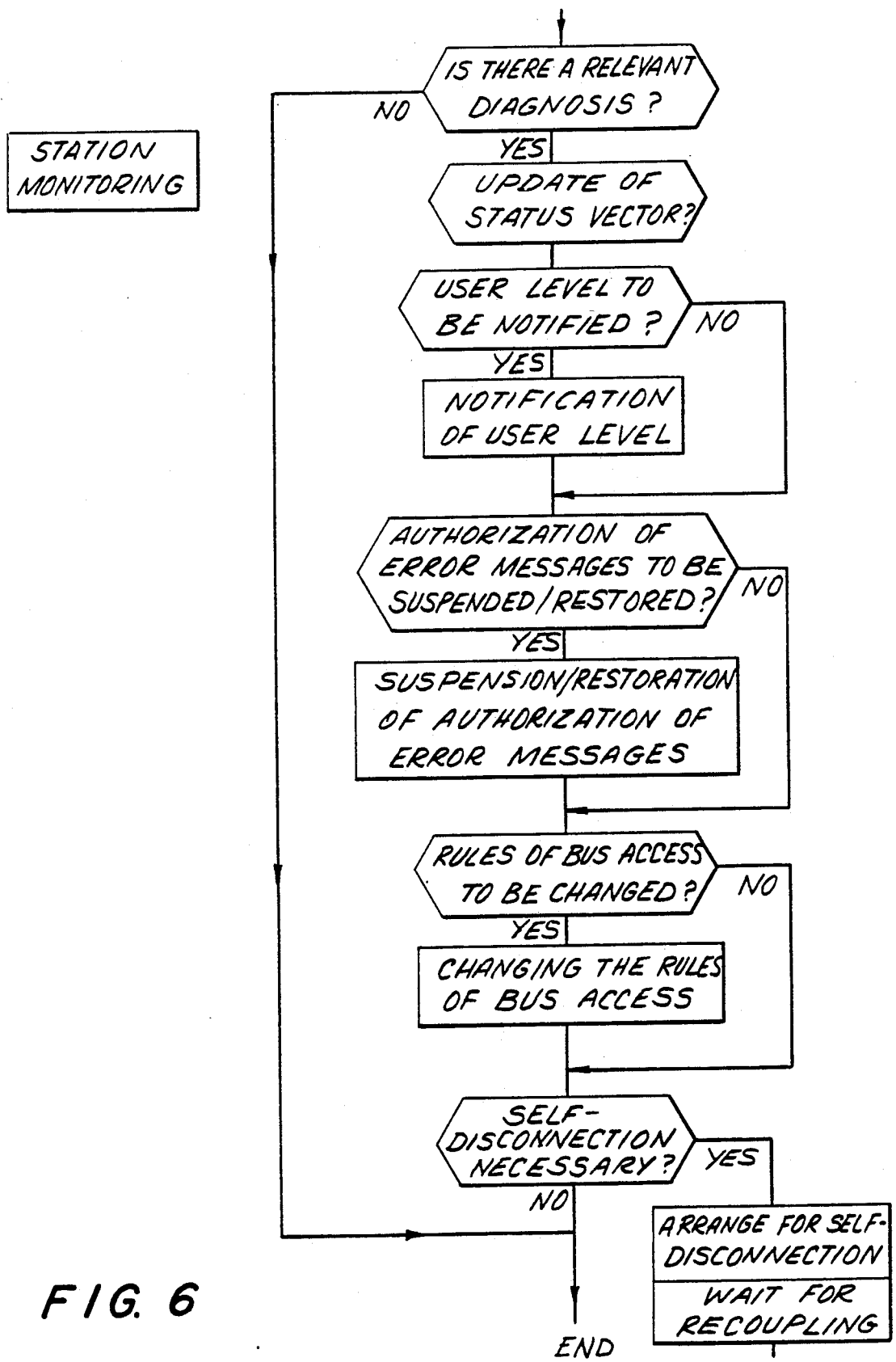
FIG. 6 shows an exemplary embodiment of a station monitoring.

Station monitoring is illustrated with the aid of the flowcharts given in FIGS. 5 and 6, which can be implemented by means of hardware or by means of software on a commercially available microcomputer.

The function block 'station monitoring', must be defined for this and linked into the communication process at the correct point in time.

2. Parameterisation Example CAN

The process described for error localization has been implemented with the communication network CAN. In this case, the parameters specified below were chosen.

2.1. Error Detection Mechanisms, Error Reporting Mechanisms, Station-Internal Conditions with CAN The variables FD for the error detection mechanisms, FM for the error reporting mechanisms and IB for the station-internal conditions are defined as follows.

Definition of FD:
FD=0: no error
FD=1: error during the transmission of a message, not due to missing acknowledgement
FD=2: error during the transmission of a message, due to missing acknowledgement
FD=3: error during the error handling routine
Definition of FM:
FM=0: positive acknowledgement
(All receivers thereby confirm simultaneously the error-free reception of the transmitted message. At the sender, the information arrives that at least one receiver has received the message error-free. Consequently, no establishment of station addresses is necessary.)
FM=1: Serious error, characterized in that the associated error message initiates further error messages at other stations.
FM=2: Less serious error, characterized in that the associated error message does not initiate an error message at any other station.
Definition of IB:
IB=0: Sender of the message authorised to issue error messages in the event of an error
IB=1: Sender of the message not authorized to issue error messages in the event of an error
IB=2: Receiver of the message

2.2. Assignment of Diagnoses

There are 7 different diagnoses, and the mapping (FD, FM, IB)→DU ( )

is given by:
1. FD=0 and FM=0 and IB=0
   →diagnosis D1
2. FD=0 and FM=0 and IB=1
   →diagnosis D1
3. FD=0 and FM=0 and IB=2
   →diagnosis D2
4. FD=1 and FM=1 and IB=0
   →diagnosis D3
5. FD=1 and FM=2 and IB=0
   →diagnosis D3
6. FD=1 and FM=1 and IB=1
   →diagnosis D3
7. FD=1 and FM=1 and IB=1
   →diagnosis D3
8. FD=2 and FM=1 and IB=0
   →diagnosis D3
9. FD=2 and FM=2 and IB=0
   →diagnosis D3
10. FD=2 and FM=1 and IB=0
    →diagnosis D3
11. FD=1 and FM=1 and IB=2
    →diagnosis D4
12. FD=2 and FM=1 and IB=2
    →diagnosis D4
13. FD=1 and FM=2 and IB=2
    →diagnosis D5
14. FD=2 and FM=2 and IB=2
    →diagnosis D5
15. FD=3 and FM=1 and IB=0
    →diagnosis D6
16. FD=3 and FM=2 and IB=0
    →diagnosis D6
17. FD=3 and FM=1 and IB=2
    →diagnosis D7
18. FD=3 and FM=2 and IB=2
    →diagnosis D7

All other combinations are mapped onto the empty set.

2.3. Status Words, Weighting of the Diagnoses

Number of status words:
n=2,
$s_1$: 8-bit word
$s_2$: 7-bit word

The status words are allocated the value 0 when there is underflow and the values 256 and 128 when there is overflow.

The matrix G(D,S) reads:

$$G(D, S) = \begin{pmatrix} -1 & 0 \\ 0 & -1 \\ 8 & 0 \\ 0 & 9 \\ 0 & 1 \\ 8 & 0 \\ 0 & 8 \end{pmatrix}$$

The entries in this matrix have been chosen such that, on average, one incorrect message every 8 correct messages can be tolerated on the sender side. On the receiver side, the tolerable ratio is 9 correct messages for every one incorrect message in the case of serious errors and one correct message for every one incorrect message in the case of non-serious errors.

2.4 Implementation of Error Statistics

The modification of the status vector is formed as follows:

$$(S_1,\ldots,S_n) := (S_1,\ldots,S_n) + D_i * G(D,S)$$

2.5. Assignment of the Status Vector to Action Classes, Measures for Error Localization a) Notification of the user level due to frequent bus errors In keeping with example a) of section 1.5., $x1=x2=96$ is chosen.

b) Changing of the rules for bus access

In keeping with example b) of section 1.5., $x3=x4=128$ is chosen.

c) No issuing of error messages in the event of an error

In keeping with example c) of section 1.5., $x5=x6=128$ is chosen.

d) Implementation of self-disconnection

Following the terms of 1.5., the associated action class is given by

S(1,256), i.e. self-disconnection takes place on overflow of status word $S_1$.

The station concerned is uncoupled from the bus as sender and receiver.

Recoupling of a previously self-disconnected station takes place
1. Under CPU control, i.e. the CPU decides whether the station remains separated from the bus temporarily or permanently.
2. There is a CAN-controller internal waiting time which is observed in any case and in addition to a CPU-defined waiting time before recoupling.

We claim:
1. A method of localization of defective stations in local networks including a plurality of data receiving and transmitting station which communicate with one another via a serial bus and each station having predetermined station-internal states, an error detection stage and an error reporting stage, the method comprising the steps of
   a continuous self-monitoring of individual stations as to their operability independent of remaining stations;
   reporting an error when a malfunction is detected;
   continuously monitoring in each station a bit stream arising on the bus from an interaction of all stations;
   responding in each station to an error message contained in the bit stream;
   setting the station-internal states in relation to information received from the bit stream;
   statistically evaluating the reported errors in each station, to determine an error frequency;
   comparing in respective stations the error frequency with a predetermined limit to initiate an action when the limit is reached.
2. A method as set forth in claim 1, further comprising the step of assigning a diagnosis D to information obtained from error detection stage (FD), error reporting stage (FM), and station-internal states (IB).

3. A method as set forth in claim 2, further comprising the step of determining vectors of status words from the error frequency and types of errors and modifying the vectors of status words by weighted use of the diagnosis D.

4. A method as set forth in claim 3, further comprising the step of initiating specific actions depending on complete contents of all vectors of the status words.

5. A method as set forth in claim 4, further comprising the step of initiating at least one of following measures:
notification of a user level due to frequent bus errors,
notification of a user level due to reduced error frequency of the bus,
changing rules for bus access,
restoration of normal rules for bus access,
suspension of authorization of error messages,
re-authorization of issuing of error messages,
implementation of self-disconnection of defective stations,
reconnection of disconnected stations.

6. A method as set forth in claim 1, wherein the error frequency in each station is a ratio of the reported error messages to correctly received information within a predetermined tolerance range of the bit stream.

7. A method as set forth in claim 1, further comprising the step of providing a redundancy at a network level without using any redundancy at individual stations, for making the stations to be protocol-compatible.

8. A method as set forth in claim 7, further comprising the step of making a recourse to the redundancy at a network level for the localization of the defective stations.

* * * * *